United States Patent
Heninwolf et al.

(10) Patent No.: US 9,451,524 B2
(45) Date of Patent: Sep. 20, 2016

(54) WIRELESS NETWORKING WITH FLEXIBLY-ORDERED RELAYERS

(71) Applicant: Google Inc., Mountain View, CA (US)

(72) Inventors: Paul Heninwolf, San Carlos, CA (US); Anand Shah, San Francisco, CA (US); Gary Morain, San Jose, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 14/012,524

(22) Filed: Aug. 28, 2013

(65) Prior Publication Data

US 2015/0063352 A1     Mar. 5, 2015

(51) Int. Cl.
*H04W 40/02* (2009.01)
*H04L 1/18* (2006.01)
*H04L 1/00* (2006.01)

(52) U.S. Cl.
CPC ............ *H04W 40/02* (2013.01); *H04L 1/1854* (2013.01); *H04L 2001/0097* (2013.01)

(58) Field of Classification Search
CPC ... H04W 40/22; H04W 40/02; H04W 88/04; H04L 1/1854; H04L 2001/0097
USPC ........................................................ 370/392
See application file for complete search history.

(56) References Cited

U.S. PATENT DOCUMENTS

| | | | |
|---|---|---|---|
| 7,065,364 B1 | 6/2006 | Todd | |
| 8,027,259 B2 | 9/2011 | Westphal | |
| 2003/0227934 A1* | 12/2003 | White et al. | 370/432 |
| 2004/0165532 A1* | 8/2004 | Poor et al. | 370/238 |
| 2005/0272366 A1 | 12/2005 | Eichinger et al. | |
| 2007/0076740 A1* | 4/2007 | Manjeshwar | 370/432 |
| 2009/0028093 A1* | 1/2009 | Shon | H04L 1/188 370/328 |
| 2009/0061767 A1 | 3/2009 | Horiuchi et al. | |
| 2009/0196194 A1* | 8/2009 | Paloheimo | H04L 45/26 370/252 |
| 2009/0316622 A1* | 12/2009 | Hirano et al. | 370/328 |
| 2010/0195665 A1 | 8/2010 | Jackson | |
| 2012/0236714 A1 | 9/2012 | Aloush | |
| 2012/0294228 A1 | 11/2012 | Song et al. | |
| 2014/0192705 A1* | 7/2014 | Ayadurai et al. | 370/315 |

OTHER PUBLICATIONS

International Search Report and Written Opinion for PCT/US2014/051797 mailed Jan. 14, 2015.
Partial International Search Report for PCT/US2014/051797 mailed Nov. 25, 2014.

* cited by examiner

*Primary Examiner* — Robert M Morlan
(74) *Attorney, Agent, or Firm* — Morris and Kamlay LLP

(57) ABSTRACT

The broadcast nature of wireless communication may be utilized by transmitting a packet frame identifying at least one relay node that can transmit the packet frame without transmitting an acknowledgement frame confirming receipt of the packet frame by a respective relay node. A relay node may cancel a relay obligation to transmit a packet frame based on detecting transmission of the packet frame by another node or based on detection of an acknowledgement frame confirming that a destination node received the packet frame. A transmission chain corresponding to the transmission of a packet frame may be assigned a priority. Alternatively or in addition, a relay node within a transmission chain may be assigned a priority. A priority may determine the amount of delay inserted prior to transmitting a packet frame.

34 Claims, 8 Drawing Sheets

WIRELESS NETWORKING WITH FLEXIBLY-ORDERED RELAYERS

BACKGROUND

Traditional multi-hop wireless protocols are structured such that a relay node that receives a packet frame from a source node or another relay node is required to transmit an acknowledge message (e.g., an implicit, silent, or explicit acknowledge message) confirming receipt of the packet frame. A source or relay node that transmits a packet frame may store the packet frame and continue to retransmit the packet frame until it receives an acknowledgement frame confirming the receipt of the packet frame by a subsequent relay or destination node. For example, a source node may transmit a packet frame intended for a destination node via relay nodes A, B, and C, in order. Relay node B may receive the packet frame from relay node A, generate and transit an acknowledgement frame to relay node A confirming receipt of the packet frame. Relay node A may retransmit the packet frame towards relay node B until it receives the acknowledgement frame (or exceeds a retransmitting limit), from relay node B, confirming the receipt of the packet frame by relay node B. Accordingly, a source or relay node may store and retransmit a packet frame for an undesirable amount of time if a subsequent relay or destination node does not receive the packet frame, or an acknowledgement frame is not successfully transmitted to the relay node.

BRIEF SUMMARY

According to implementations of the disclosed subject matter, a relay node may receive a packet frame identifying the relay node and transmit the packet frame without transmitting an acknowledgement frame confirming that the packet frame was received by the relay node. The packet frame may be stored at the relay node and removed from the relay node after it is transmitted. The relay node or another relay node may receive an acknowledgement frame confirming that a destination node received the packet frame and may transmit the acknowledgement frame. The relay node may be an out of order relay node, and another relay node may cancel a relay obligation based on the transmission of the packet frame by the out of order relay node. Alternatively or in addition, a relay node may cancel a relay obligation based on an acknowledgement frame. A priority may be associated with one or more relay nodes or a transmission chain. Additionally, one or more delay times may be determined based on a relay node priority.

According to implementations of the disclosed subject matter, a packet frame intended for a destination node may be sent from a source node via one or more relay nodes. At least one acknowledgement frame confirming the receipt of the packet frame by the destination node may be received at the source node, from a relay node, in response to the packet frame.

According to implementations of the disclosed subject matter, a packet frame intended for a first destination node and a second destination node may be sent from a source node via one or more relay nodes. At least one acknowledgement frame confirming the receipt of the packet frame by the first destination node may be received in response to receipt of the packet frame by the first destination node and at least one acknowledgement frame confirming the receipt of the packet frame by the second destination node may be received in response to receipt of the packet frame by the second destination node.

According to implementations of the disclosed subject matter, a packet frame intended for a destination node may be sent from a source node, via one or more relay nodes. The packet frame may be received at and transmitted by the first relay node without the first relay node transmitting an acknowledgement frame confirmation that the packet frame was received. A second relay node may receive an acknowledgement frame confirming that a destination node received the packet frame and may transmit the acknowledgment frame. A source node may receive the acknowledgement frame.

Systems and techniques according to the present disclosure enable efficient transmission of a packet frame via one or more relay nodes, without the relay nodes generating and/or transmitting acknowledgement frames confirming receipt of the packet frame. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
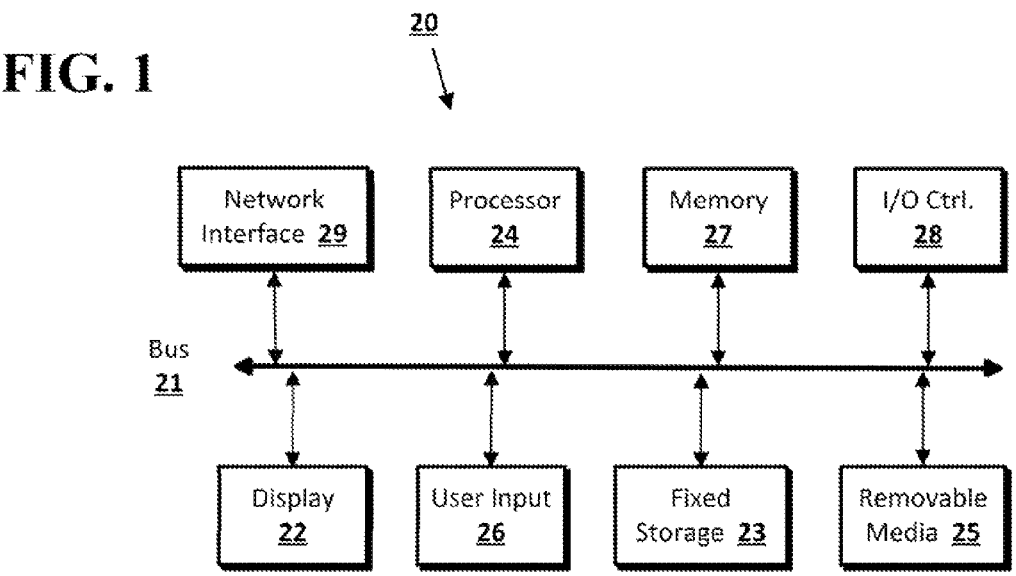
FIG. 1 shows a computer according to an implementation of the disclosed subject matter.

Attempting to propagate a message through a network via a series of point-to-point hops (e.g., via relay nodes), resulting in respective acknowledge messages, may decrease the propagation speed and/or require an unacceptable amount of storage space on one or more relay nodes. Taking advantage of the broadcast nature of wireless communication can improve network performance by improving reliability and medium efficiency of a wireless network. Additionally, the worst case latency for a source's retransmission of a packet frame may be lower. According to implementations of the disclosed subject matter, a relay node may receive a packet frame identifying the relay node in any applicable manner such as a node identifier contained within a packet frame. The relay node may relay the packet frame based on a determination that it is an identified relay node, without transmitting an acknowledgement frame confirming receipt of the packet frame. Notably, a transmitting relay or source node that originally transmits the packet frame to a receiving relay node may not expect an acknowledgement frame confirming the receipt of the packet frame by the receiving relay node. The transmitting relay or source node may not be responsible for ensuring that a receiving relay node received the packet frame transmitted by the transmitting relay or source node. Further, the transmitting relay or source node may remove the previously stored packet frame from its memory after transmitting the packet frame.

According to implementations of the disclosed subject matter, an out of order relay node may receive the packet frame transmitted by the transmitting relay or source node and transmit the packet frame despite not receiving the packet frame in order. As an example, a source node S may transmit a packet frame intended for destination D via identified relay nodes A, B, and C. Relay node B may receive the packet frame and, without transmitting an acknowledgement frame, may transmit the packet frame. Similarly, a destination node may receive a packet frame out of order. As an example, a source node S may transmit a packet frame intend for destination D via identified relay nodes A, B, and C with an expected relay order: A, B, and C. Destination node D may receive the packet frame from relay node B and transmit an acknowledgement frame despite not receiving the packet frame from expected relay node C. According to implementations of the disclosed subject matter a relay node may cancel a relay obligation based on detecting a transmission of the packet frame by a subsequent relay node or an acknowledgement frame confirming receipt of the packet frame by an intended destination node. Continuing the previous example, relay node A may cancel a relay obligation to transmit the packet frame when it receives an acknowledgement frame confirming receipt of the packet frame by destination D. A priority may be associated with a packet frame transmission chain (i.e., from a source to at least one destination node) and/or a priority may be associated with a relay node that is identified as part of the transmission chain. Delay times (e.g., an amount of delay prior to transmission by a relay node) may be determined based on priority, as disclosed herein.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
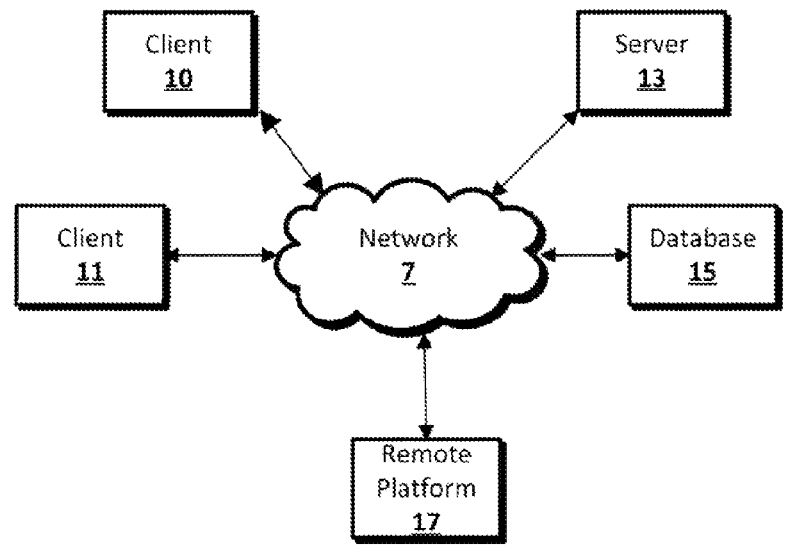
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
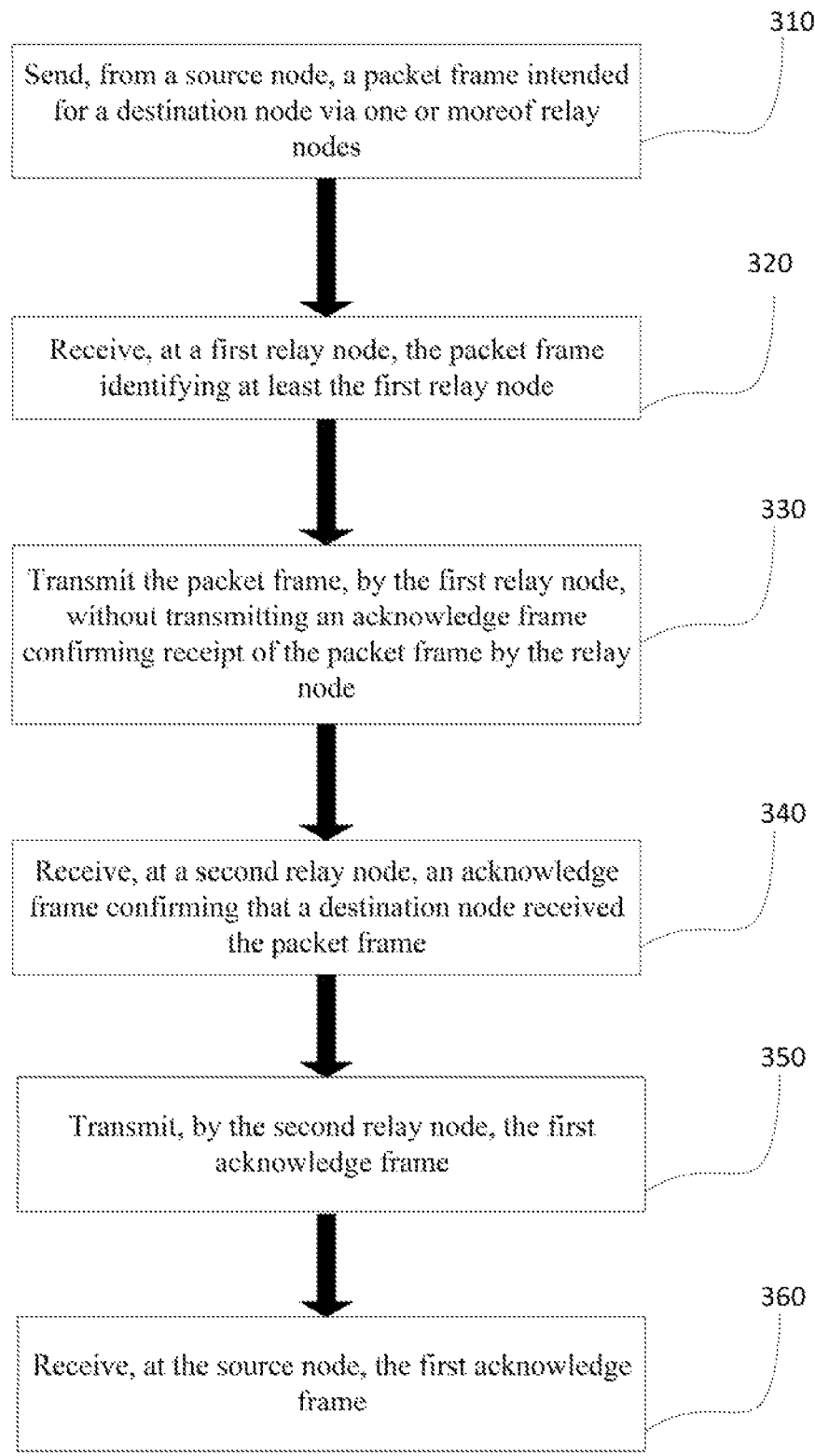
FIG. 3 shows an example process for receiving a packet frame without generating an acknowledgement frame according to an implementation of the disclosed subject matter.
Figure 5A:
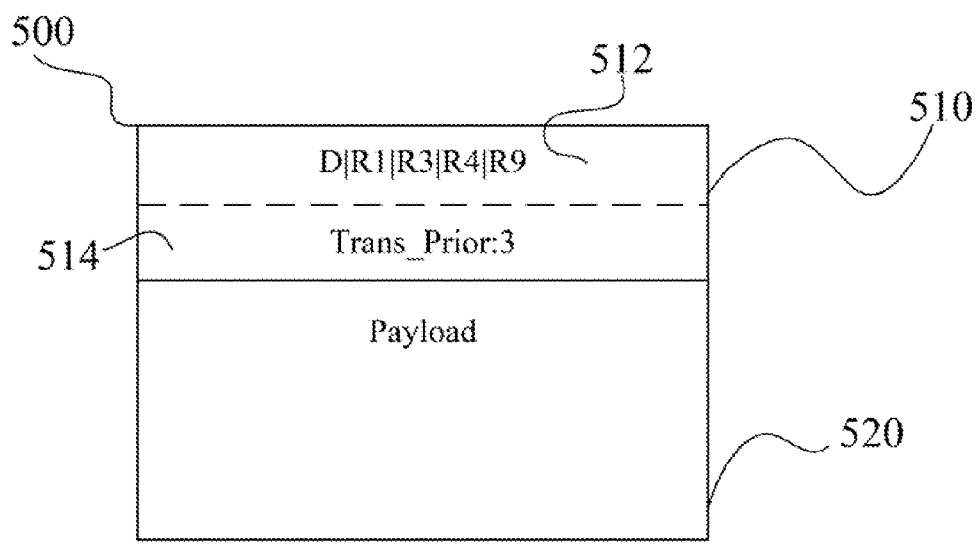
FIG. 5a shows an example visualization corresponding to a packet frame with a transmission chain priority according to an implementation of the disclosed subject matter.

According to implementations of the disclosed subject matter, as shown at step 310 in FIG. 3, a source node may transmit a packet frame intended for a destination node via one or more relay nodes. The packet frame may contain the length of a packet for transmission, the number of relay nodes intended to repeat the transmission, identification information related to the relaying nodes, and frame transmission fields such as the source, destination, payload, and the like. The one or more relay nodes may be determined using any applicable technique such as historical data, a predetermined reliable communication path, or the like, as disclosed herein. As an illustrative example, as shown in FIG. 5a, a packet frame 500 may contain a payload section 520 and a header section 510. The payload section 520 may contain any applicable data such as user data, network data, requested content, communication data, or the like. Essentially, the payload section may contain substantive data that is intended to be communicated from a source node to a destination node. The header section may contain transmission information such as one or more relay node identifiers, packet length, transmission properties, transmission priorities, or the like. As shown in FIG. 5a, the header section 510 may identify relay nodes 512 as well as a transmission chain priority 514.

As shown at step 320 in FIG. 3, a receiving relay node may receive a packet frame identifying the receiving relay node. The packet frame may be transmitted by a transmitting source or relay node and may identify the receiving relay node using any applicable technique, such as a node ID contained within the packet frame's header. The transmitting source or relay node may be any node in a network that is part of a packet frame transmission chain (e.g., a source, relay, or destination node within a packet frame transmission chain). The receiving relay node may store the packet frame using any applicable technique such as by storing it in a physical memory, virtual memory, a cache memory, disk buffer, or the like. The storage may be temporary and may only last for the amount of time it takes for the relay node to receive and transmit the packet frame. As a specific example, the amount of time a packet frame is stored by a receiving relay node may equal the logic processing time required for the relay node to transmit the packet frame. Alternatively, the packet frame may be stored for a longer length of time such as during a delay period determined based on a priority value, as disclosed herein.

As shown at step 330, a receiving relay node that receives the relay node form a transmitting source or relay node may transmit the packet frame without transmitting an acknowledgement frame confirming receipt of the packet frame by the receiving relay node. Effectively, the transmitting source or relay node that initially transmitted the packet frame received by the receiving node may not look for and/or expect an acknowledgement frame confirming receipt of the packet frame by either the receiving relay node or any other relay node (a source node may, however, look for and/or expect an acknowledgement frame confirming receipt of the packet frame by a destination node). The transmitting source or relay node may remove the packet frame from storage after transmitting the packet frame a predetermined number of times. Notably, a relay node may be relieved of its relay obligation when it has transmitted a packet frame a predetermined number of times (e.g., 1 time, 2 times, a number of times based on a transmission priority, etc.), and may not rely on acknowledgement frames from a relay node to cancel the obligation. As an example, a source node may transmit a packet frame that identifies relay nodes A, B, and C as part of the packet frame transmission chain. Relay node A may receive the packet frame from the source node and transmit the packet frame. Relay node A, after transmitting the packet frame, may be relieved of its relay obligation and remove the packet frame from its memory without receiving an acknowledgement frame confirming receipt of the packet frame by either relay nodes B or C. Relay node B may receive the packet frame from relay node B and transmit the packet frame without transmitting an acknowledgement frame confirming receipt of the packet frame. In essence, canceling relay obligations may enable an arrangement to add more nodes to a transmission chain, effectively increasing the probability that a packet frame reaches one or more destination nodes without substantially increasing network load.

Figure 4A:
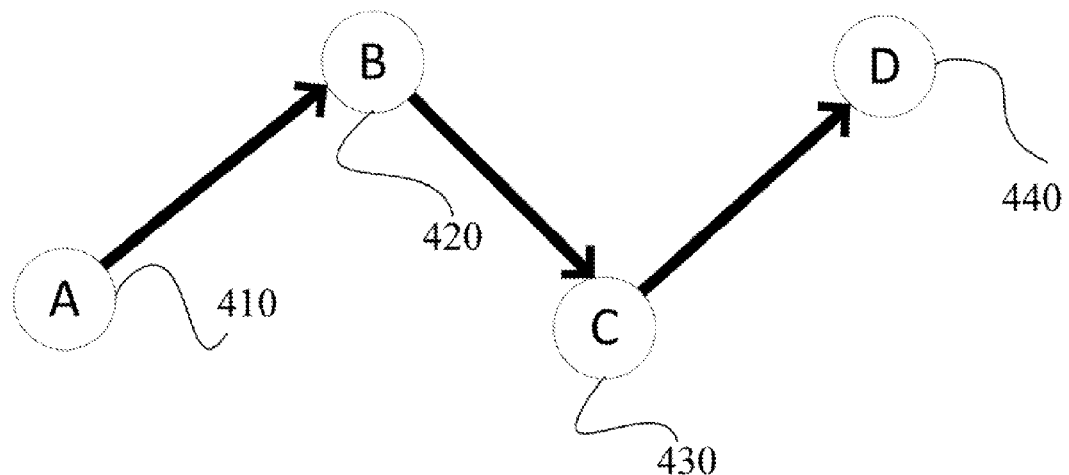
FIG. 4a shows an example visualization corresponding to a node structure and intended transmission route according to an implementation of the disclosed subject matter.

As an illustrative example, as shown in FIG. 4a, a source node A 410 may transmit a packet frame X, the packet frame X intended for destination node D 440. The packet frame X may identify relay nodes B 420 and C 430 as part of the transmission chain. Relay node B 420 may receive packet frame X and, without transmitting an acknowledge message confirming receipt of the packet frame X, may store and/or transmit packet frame X. Subsequently, relay node B 420 may remove packet frame X from its memory without waiting to receive an acknowledge message confirming that packet frame X has been received by another relay node. Essentially, the arrangement may not require that relay node B 420 retransmit the packet frame X. Notably, in some conventional arrangements, B 420 may be required to retransmit packet frame X until an acknowledgement frame is received. However, according to the disclosed implementations, B 420 need not continue retransmitting based on the lack of an acknowledge frame. Relay node C 430 may receive packet frame X and, without transmitting an acknowledgement message confirming receipt of the packet frame X, may store and/or transmit packet frame X. Subsequently, relay node C 430 may remove packet frame X from its memory without waiting to receive an acknowledge message confirming that packet frame X has been received by another relay node. Essentially, the arrangement may not require that relay node C 430 retransmit the packet frame X. Notably, in some conventional arrangements, C 430 may be required to retransmit packet frame X until an acknowledgement frame is received. However, according to the disclosed implementations, C 430 need not continue retransmitting based on the lack of an acknowledge frame.

As shown at step 340 in FIG. 3, a relay node may receive an acknowledgement frame confirming that a destination node received a packet frame. The relay node that receives the acknowledge frame may have relayed the packet frame towards the destination node. The acknowledgement frame may contain any appropriate delivery-based information including, but not limited to, no delivery, frame received but rejected, frame received, frame received and accepted and working, frame received accepted and complete, or the like. Additionally, the acknowledgement frame may contain a header section which includes transmission information such as relay node identifiers, packet length, transmission properties, transmission priorities, or the like. The header information may be the same as or similar to the header information contained in the packet frame, the delivery of which is confirmed by the acknowledgement frame. For example, packet frame X may be transmitted from a source node S to a destination node D and may identify relay nodes R1, R2 and R4 as part of the transmission chain. Destination node D may generate and transmit an acknowledgement frame Y upon receipt of the packet frame X. Acknowledgement frame Y may identify the same relay nodes, R1, R2, and R4 such that the acknowledgement frame Y is intended to be delivered to the source node S via the same or similar relay nodes that the packet frame X was intended to be relayed via, from the source node S to destination node D. At step 350, a relay node that receives the acknowledgement frame may transmit the acknowledgement frame and, at step 360, a source node may receive the acknowledgement frame. The source node may take any applicable action upon receipt of the acknowledgement frame such as canceling a re-transmission obligation, initiating a subsequent packet frame transmission, change modes (e.g., enter a standby mode, receive instruction mode, etc.), or the like. As an illustrative example, as shown in FIG. 4c a destination node D 440 may receive a packet frame, generate, and transmit a acknowledge frame confirming receipt of the packet frame. The acknowledge frame may identify relay nodes C 430 and B 420. Relay node C 430 may receive the acknowledge frame and relay it. Relay node B 420 may receive the acknowledge frame and relay it. Source node A 410 may receive the acknowledge frame and cancel a retransmission obligation. A relay node may receive an acknowledgement frame confirming receipt of a packet frame and cancel a relay obligation (i.e., to relay the same packet frame) accordingly. An acknowledge frame may be received and relayed by an out of order relay node and a different relay node may cancel a relay obligation based on the relay by the out of order relay node.

Figure 4B:
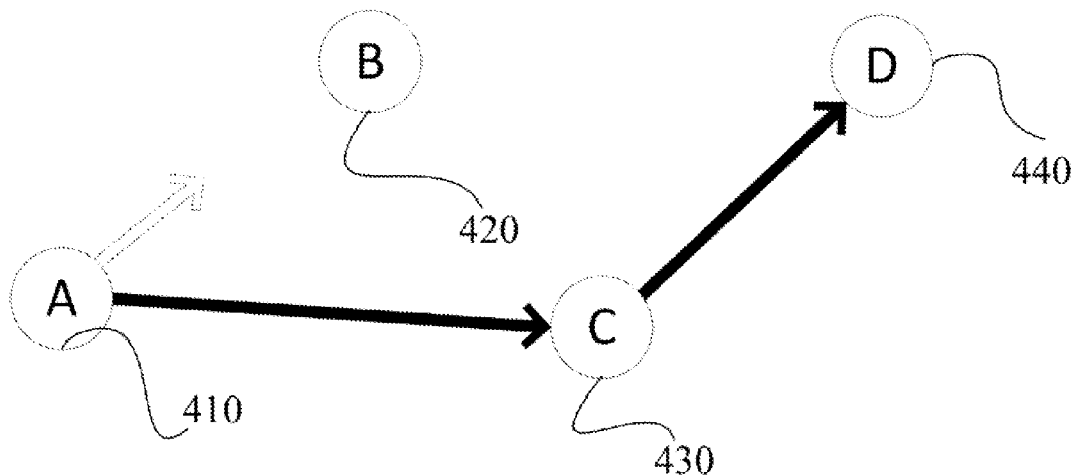
FIG. 4b shows an example visualization corresponding to a node structure and an un-intended transmission route according to an implementation of the disclosed subject matter.
Figure 4C:
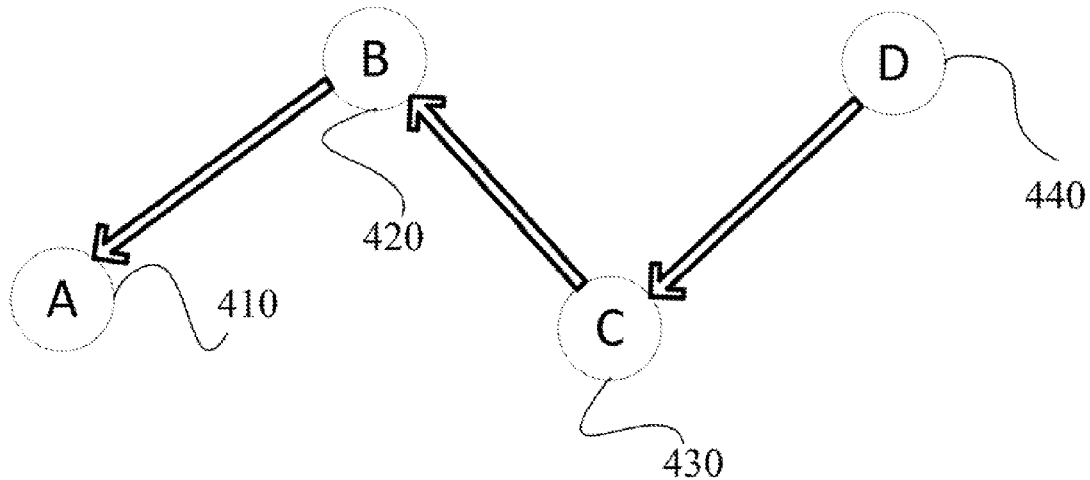
FIG. 4c shows an example visualization corresponding to a node structure and intended acknowledge route according to an implementation of the disclosed subject matter.

As an illustrative example, as shown in FIG. 4b, a destination node D 440 may transmit an acknowledgement frame Y, the acknowledgement frame Y intended for source node A 410. The acknowledgement frame Y may identify relay nodes C 430 and B 420 as part of the transmission chain for the acknowledgement frame Y. Relay node C 430 may receive acknowledgement frame Y and store and/or transmit acknowledgement frame Y. Subsequently, relay node C 430 may remove acknowledgement frame Y from its memory. Relay node B 420 may receive acknowledgement frame Y and store and/or transmit packet frame X. Subsequently, relay node B 420 may remove acknowledgement frame Y from its memory.

According to implementations of the disclosed subject matter, a source node, destination node, and relay nodes that are part of a packet or acknowledge frame transmission chain may be participant nodes and other nodes within the network may be non-participant nodes. A non-participant node may be a node that is not a source, destination, or intended relay node with respect to a transmission chain. For example, a Wi-Fi router may transmit a packet frame that identifies relay nodes R1, R2, and R3. During the course of the transmission of the packet frame between the Wi-Fi router and a destination node via determined relay nodes R1, R2 and R3, a non-participating relay node R4 may receive the packet frame and may not store and/or transmit the received packet frame. A non-participant node may take note of a packet frame transmission to avoid collision activities, as disclosed herein. For example, a non-participant node that sees the transmission of a packet frame may delay transmitting a frame for a given amount of time to avoid a collision with the packet transmission. Notably, a non-participant node may disregard a packet frame (i.e., a packet frame that does not identify the non-participant node) for purposes related to transmitting the packet frame. However, the non-participant node may consider the transmission of the packet frame for network transmission purposes (e.g., network load, collision avoidance, etc.).

According to implementations of the disclosed subject matter, a packet frame may be received by an out of order relay node. An out of order relay node may be a participating node, but that is not a subsequent expected node. A transmission chain may include relay nodes intended to relay a packet or acknowledgement frame and an out of order node may be a participating node that is not sequentially subsequent to a transmitting node. The order of nodes in a transmission chain may be determined based on the techniques disclosed herein. As an example of an out of order relay node, a router may transmit an instruction message intended for a laptop, the instruction message to be relayed through relay node A, B, and C. The router, relay nodes A, B, C, and the laptop may all be participating nodes part of the instruction message transmission chain. The relay nodes may be set up such that the router, relay node A, relay node B, relay node C and laptop are sequentially arranged in that order. Alternatively or in addition, relay nodes A, B, and C may be identified in a header portion of instruction message, in that order. Accordingly, if relay node B receives a transmission directly from the router, instead of receiving it from relay node A, then relay node B can be an out of order relay node. A packet frame received by an out of order relay node may be transmitted by the out of order relay node despite being received out of order.

As an illustrative example, as shown in FIG. 4b, a source node A 410 may transmit a packet frame X, the packet frame X intended for destination node D 440. The packet frame X may be received by out of order relay node C 430 directly from source node A 410. Despite not having received the packet frame X in order from relay node B 420, out of order relay node C 430 may transmit the packet frame X, and destination node D 440 may receive the packet frame X. An example of a relay node order identified in a packet frame is illustrated in FIG. 5a. The header portion of packet frame 500 may identify relay nodes in order. As shown in section 512, the order for the identified relay nodes for packet frame 500 may be R1, R3, R4, and R9. As another example, a packet frame Y intended for a destination node D1 may be received by an in order relay node P. The relay node P may retransmit the packet frame Y and the destination node D1 may receive the packet frame Y without the packet frame Y being relayed by a subsequent expected relay node Q. The destination node D1 may transmit an acknowledgement frame confirming receipt of the packet frame Y despite not receiving the packet frame Y from the subsequent expected relay node Q.

The order of nodes in a transmission chain may be determined based on the topology of the source, destination, or relay nodes. Namely, a sequentially subsequent node may be a node that is proximally closest to the transmitting node in the appropriate direction. For example, a source, relay A, relay B, and destination node may be arranged in a line such that the source is located at location 1, relay A at location 2, ten feet from the source in the x direction, relay B at location 3, ten feet from relay A in the x direction, and the destination node at location 4, ten feet from relay B in the x direction. Accordingly, the order of the nodes can be either source, relay A, relay B, destination or, in reverse as, destination, relay B, relay A, source. In essence, according to this example, the order is based on the physical location of the nodes. As an example of ordering nodes based on network topology, a source, relay A, relay B, and destination node may be arranged such that the expected transmit time from the source to relay A is 4 ms, the shortest length of time between the source and any other node. The expected transmit time from relay A to relay B is 5 ms, the shortest length of time between relay A and any other node other than the source node. The expected time from relay B to the destination node is 4 ms, the shortest length of time between relay B and any other node. Accordingly, the order of the nodes can be either source, relay A, relay B, destination or, in reverse as, destination, relay B, relay A, source. In essence, according to this example, the order is based on the network topology associated with the given nodes. Network topology and arrangement may be based on considerations other than physical arrangement and expected transit time, as will be readily understood by one of skill in the art.

According to implementations of the disclosed subject matter, a transmission order may be based on network topology as provided by a network controller. The network controller may communicate with a source node and the source node may develop a transmission order based on reliable communication. For example, a network controller may determine the topology the network, and the network location of each node in the network, by transmitting instructions for all nodes to ping the controller. The controller can provide a source node with the topology information and the source node can determine which relay nodes are necessary for a transmission. A controller may update network topology based on periodic pings such that the controller pings all the nodes during predetermined periodic intervals. Alternatively, the controller may update network topology by receiving automated pings when a node is added or removed from the network. Alternatively or in addition, one or more relay nodes may ping each other and/or a neighboring node and subsequently provide the controller with resulting transmission information. For example, each node in a transmission chain my ping one or more neighboring nodes and record signal strength or packet success rate data. Each node may transmit the information to a controller which can analyze the information and determine a transmission order based on the analysis. Notably, relay nodes may be selected to be a part of a transmission chain based on reliably communicating with other nodes or with a controller.

Figure 7:
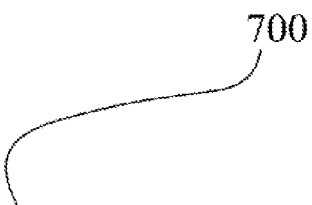
FIG. 7 shows an example table for determining relay nodes for a transmission chain according to an implementation of the disclosed subject matter.

According to implementations of the disclosed subject matter, a transmission order may be based on historical data. The arrangement may determine relay nodes to be included in a transmission chain based on historical data collected during past transmissions. The historical data may be any applicable data such as signal strength, percentage of success, percentage of failure, number of transmissions, node ranking, or the like. For example, as shown by table 700 in FIG. 7, successful transmission percentages to destination node D1 by five different relay nodes may be stored by the arrangement. The arrangement may determine a set of relay nodes based on any applicable factor such as the importance associated with the packet frame reaching one or more destination nodes, speed, duration, size of the packet frame, or the like. A fewer number of relay nodes may be included in a transmission chain in order to increase the speed at which the packet frame reaches one or more destination nodes. It will be understood that, as disclosed herein, although an out of order packet frame may relay a packet frame, a higher number of relay nodes may increase the time it takes for a packet frame to reach a destination node due to network limitations such as contention periods and/or collision avoidance techniques.

According to implementations of the disclosed subject matter, a relay node may cancel a relay obligation based on a transmitted packet frame or an acknowledgement frame. A relay node that receives a packet frame may not immediately transmit/relay the packet frame for any applicable reason such as network delay, collision avoidance (e.g., transmitting frames at the same time as one or more other nodes, over burdening one or more receiving nodes, etc.), a predetermined delay, a priority based delay, or the like. Thus, if the relay node determines that the packet frame that has not yet been relayed by the relay node has already been relayed by another relay node, then the relay node may cancel its obligation to relay the packet frame. Similarly, a relay node may receive an acknowledge frame conforming receipt of the packet frame that the relay node is to transmit/relay. Based on the acknowledge frame, the relay node may cancel its obligation to relay the packet frame. Canceling relay obligations may avoid redundancy and reduce network load.

Figure 6A:
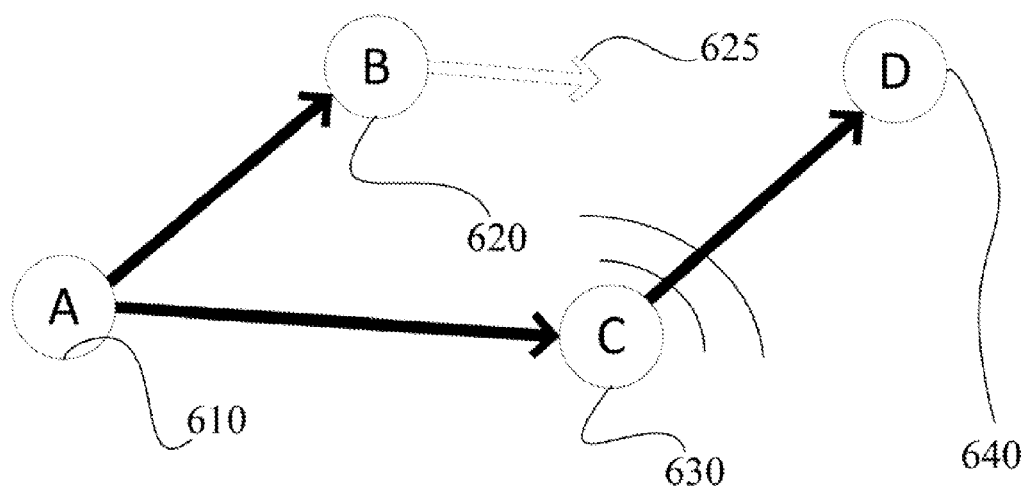
FIG. 6a shows an example visualization corresponding to a packet frame based obligation cancelation according to an implementation of the disclosed subject matter.

A relay node that receives the packet frame and has not relayed the packet frame may determine that another relay node has transmitted the packet frame and, accordingly, cancel its relay obligation to transmit the packet frame. Notably, detecting a transmission of the packet frame by another relay node (e.g., a subsequent relay node) may indicate that transmitting the packet frame by the current relay node may be redundant and, thus, unnecessary. As an illustrative example, as shown in FIG. 6a, a source node A 610 may transmit a packet frame that identifies relay nodes B 620 and C 630. The packet frame may be received by both relay node B 620 and relay node C 630. Relay node C 630 may transmit the packet frame prior to the transmission of the packet frame by relay node B 620. Relay node B 620 may determine that the packet frame has been transmitted by another node (e.g., has been transmitted by any other node, transmitted specifically by relay node C, transmitted by a subsequent node, etc.) and cancel its obligation to transmit the packet frame. Thus, an expected or otherwise planned transmission 625 of the packet frame by node B may not be made by node B.

Figure 6B:
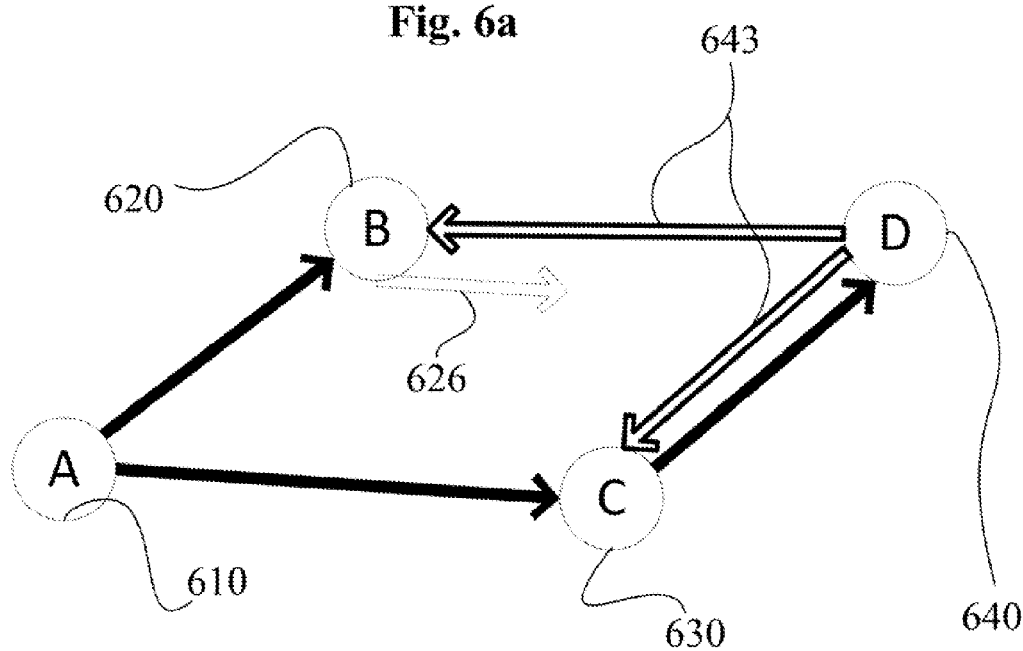
FIG. 6b shows an example visualization corresponding to an acknowledgement frame based obligation cancelation according to an implementation of the disclosed subject matter.

A relay node that receives the packet frame and has not relayed the packet frame may receive an acknowledgement frame confirming that a destination node received the packet frame and, accordingly, cancel its relay obligation to transmit the packet frame. Notably, an acknowledgement frame confirming receipt of the packet frame by a destination node may indicate that transmitting the packet frame by the current relay node may be unnecessary as the desired result (i.e., providing the packet frame to the destination node) has been achieved. As an illustrative example, as shown in FIG. 6b, a source node A 610 may transmit a packet frame that identifies relay nodes B 620 and C 630. The packet frame may be received by both relay node B 620 and relay node C 630. Relay node C 630 may transmit the packet frame prior to the transmission of the packet frame by relay node B 620. Additionally, destination node D 640 may receive the packet frame, generate an acknowledgement frame confirming receipt of the packet frame, and transmit the acknowledgement frame 643. Relay node B 620 may receive the acknowledgement frame and cancel its obligation to transmit the packet frame at 626, as would otherwise occur.

Figure 6C:
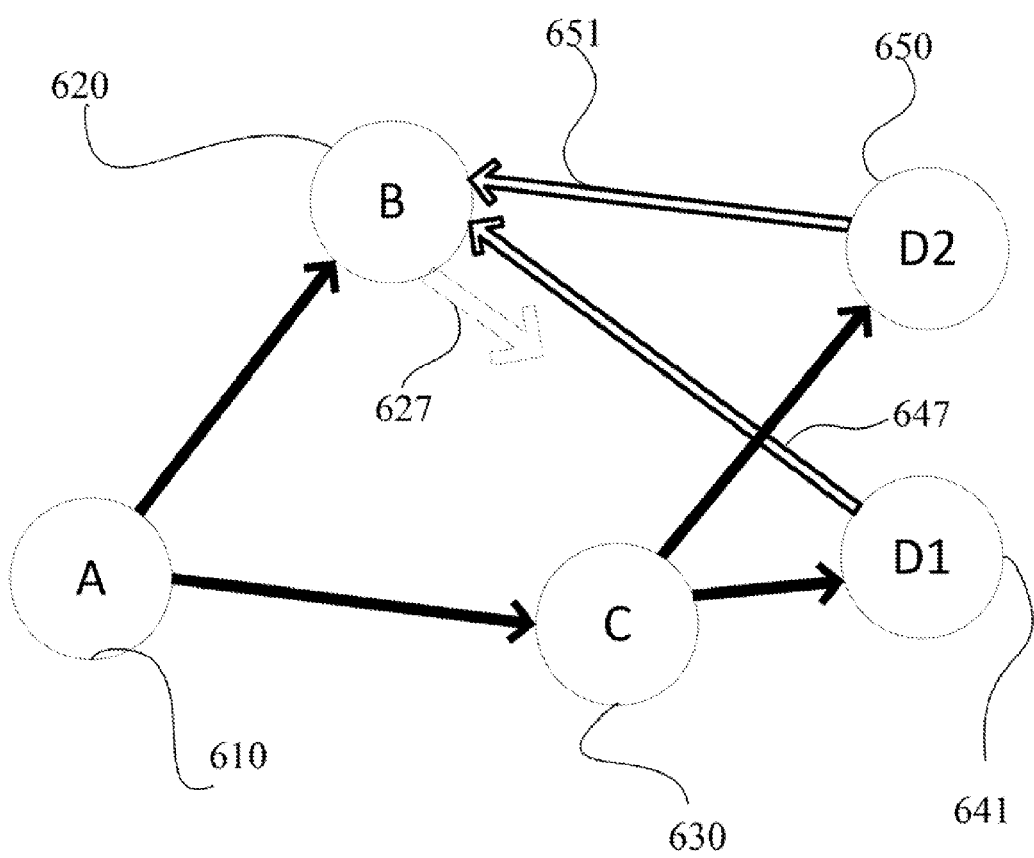
FIG. 6c shows an example visualization corresponding to a multi-acknowledgement frame based obligation cancelation according to an implementation of the disclosed subject matter.

According to implementations of the disclosed subject matter, multiple destination nodes may receive a packet frame transmitted by a source node. The packet frame may be transmitted by a source node, intended to be received by multiple destination nodes via one or more relay nodes. As an illustrative example, as shown in FIG. 6c, source node A 610 may transmit a packet frame intended for destination nodes D1 641 and D2 650 via relay nodes B 620 and C 630. The packet frame may be received by both relay node B 620 and relay node C 630. Relay node C 630 may transmit the packet frame prior to the transmission of the packet frame by relay node B 620. Additionally, destination nodes D1 641 and D2 650 may receive the packet frame, generate respective acknowledgement frames confirming receipt of the packet frame, and transmit the acknowledgement frames 647 and 651. Relay node B 620 may receive the acknowledgement frames and cancel its obligation to transmit the packet frame at 627 based on receiving both acknowledgement frames. Notably, the packet frame may contain destination node information such that both nodes D1 641 and D2 650 are identified as intended destination nodes. Accordingly, relay node B 620 may cancel its obligation to transmit the packet frame only when acknowledgement frames confirming receipt of the packet frame by both D1 641 and D2 650 are received by relay node B 620. Receiving an acknowledgement frame from only one of D1 641 or D2 650 may not result in canceling relay node B's relay obligation.

According to implementations of the disclosed subject matter, a relay node priority may be assigned to one or more relay nodes within a transmission chain. Alternatively or in addition, a transmission chain priority may be assigned to a packet or acknowledge frame transmission. A priority may enable prioritization of transmissions by relay nodes for any applicable reason such as to maintain a desirable network load, increase the probability of transmission of a packet frame, increase the speed of transmission of a packet frame, utilize one or more specific nodes, or the like.

Figure 5B:
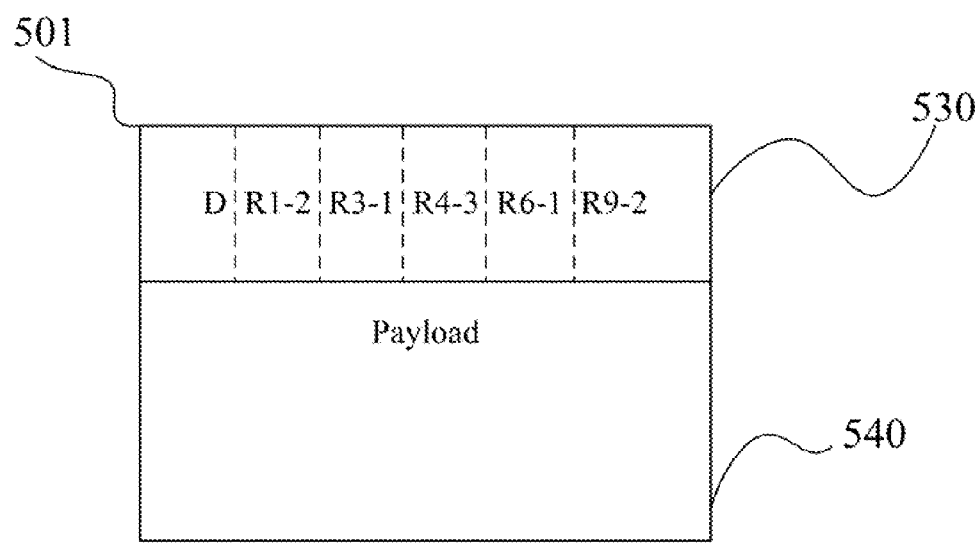
FIG. 5b shows an example visualization corresponding to a packet frame with node priorities according to an implementation of the disclosed subject matter.

A relay node priority may be determined by the source node or a general priority may be assigned to a relay node for all transmissions. For example, a source node may transmit packet frame X which identifies relay nodes R1 and R2 as well as relay node priorities for both relay node R1 and R2. In an illustrative example, as shown in FIG. 5b, packet frame 501 may contain a header that identifies the destination node D as well as relay nodes R1, R3, R4, R6, and R9. Additionally, the header may contain a priority associated with each relay node. As shown, header 530 includes the identified nodes and their associated priorities (i.e., R1-2, R3-1, R4-3, R6-1, and R9-2). Alternatively, as an example, relay node R2 may have a general priority assigned to it for transmitting one or more packet frames. The general priority assigned to a relay node may be permanent or may be modified by any applicable technique by the relay node, a source node, a controller, or the like.

The priority for a relay node may determine when the relay node relays a packet frame (e.g., a time for relaying a packet, a delay, etc.). A relay node with a higher priority value may relay (i.e., transmit a received frame) a frame faster than a relay node with a lower priority value. The time based on the priority may be relative to when a relay node receives a packet frame, when a source node transmits a packet frame to be relayed, or the like. As an example, as shown in FIG. 5b, relay node R1 has a priority of 1 whereas relay node R4 has a priority or 3. Accordingly, if both relay node R1 and relay node R4 receive a packet frame at the same time, relay node R1 may relay the packet frame before relay node R4 does. Alternatively, the priority based relay time may be relative to when a source node transmits the packet frame such that a priority 1 relay node may relay a packet frame 1 ms after the transmission whereas a priority 3 relay node may relay a packet frame 4 ms after the transmission. Accordingly, if R1 and R4 both receive a packet frame transmitted by the source node 2 ms after the transmission by the source node, then R1 may relay the packet frame immediately whereas R4 would insert a 3 ms delay prior to relaying the packet frame. It will be understood that the priority values are relative, and a specific implementation may reverse the order such that a lower priority relay node transmits a packet frame faster than a higher priority node.

A priority may be associated with a packet frame transmission chain. A packet frame in a transmission chain with a higher priority value may be transmitted by relay nodes faster than a packet frame in a transmission chain with a lower priority value. The packet frame transmission chain priority may be designated by any applicable technique via a source node, relay node, controller, or the like. As an illustrative example, as shown in FIG. 5a, a source node may transmit a packet frame 500. The packet frame 500 may contain a header section 510 which includes a transmission chain priority 514 of 3. As another example, packet frame transmission chains P1 and P2 may have priorities 2 and 4 respectively. Accordingly, if one or more relay nodes receive both P1 and P2 at the same time, the one or more relay nodes may relay the respective packet frame corresponding to P1 before relaying the packet frame corresponding to P2. Alternatively, a priority value of 2 may correspond to a delay of 2 ms and a priority value of 4 may correspond to a delay of 4 ms. Accordingly, relay node R1 which receives P1 may delay relaying the corresponding packet frame by 2 ms and relay node R2 which receives P2 may delay relaying the corresponding packet frame by 4 ms. It will be understood that the priority values are relative, and a specific implementation may reverse the order such that a lower priority relay node transmits a packet frame faster than a higher priority node.

A priority may be associated with an acknowledgement frame confirming receipt of a packet frame. The acknowledge frame transmission chain priority may be implemented in a manner similar to a packet frame transmission chain priority. For example, the arrangement may handle an acknowledge frame transmission chain with a priority of 2 in the same manner that the arrangement handles a packet frame transmission chain with a priority of 2. According to an implementation of the disclosed subject matter, a higher priority may be associated with an acknowledge frame than a packet frame. Notably, a first relay node may receive a packet frame, and prior to relaying the packet frame, the destination node may also receive the packet frame, as disclosed herein. Accordingly, a transmission of the packet frame by the first relay node may be unnecessary as the packet frame is already received by the destination node. Here, an acknowledge frame with a higher priority may be transmitted by the destination node and be received by the first node prior to the first node relaying the packet frame. Thus, the first node may cancel its obligation to relay the packet frame, effectively reducing network load.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, at a first relay node, a packet frame comprising a transmission chain, wherein the transmission chain identifies the first relay node and includes a first relay node priority value for the first relay node;
transmitting the packet frame, by the first relay node, after a first delay time based on the first relay node priority value;
receiving, at a second relay node, at the same time as or before the receiving of the packet frame by the first relay node, the packet frame, wherein the transmission chain identifies the second relay node as a subsequent relay node to the first relay node and includes a second relay node priority value for the second relay node, the second relay node priority value not equal to the first relay node priority value; and
transmitting the packet frame, by the second relay node, after a second delay time based on the second relay node priority value, wherein the second delay time is longer than the first delay time and the transmitting of the packet frame by the second relay node occurs after the transmitting of the packet frame by the first relay node, and
wherein the first relay node receives the packet frame before any transmission of the packet frame by the second relay node.

2. The method of claim 1, further comprising:
storing the packet frame identifying the first relay node, at the first relay node, subsequent to receiving the packet frame; and
removing the packet frame, from the first relay node, subsequent to transmitting the packet frame by the first relay node.

3. The method of claim 1, wherein the packet frame identifies at least one relay node.

4. The method of claim wherein the first relay node is an out of order relay node.

5. The method of claim 4, wherein a third relay node cancels a relay obligation based on transmitting the packet frame by the out of order first relay node.

6. The method of claim 1, wherein the destination node receives the packet frame out of order.

7. The method of claim 1, wherein a third relay node cancels a relay obligation based on the first acknowledgement frame.

8. The method of claim 7, wherein the relay obligation is a transmission frame relay obligation.

9. The method of claim 1, further comprising:
receiving a second acknowledgement frame confirming that a second destination node received the packet frame; and
transmitting the second acknowledgement frame.

10. The method of claim 9, wherein a relay node cancels a relay obligation based on the first and the second acknowledgement frame.

11. The method of claim 1, wherein the first delay time based on the first relay node priority for the first relay node is 0 ms.

12. The method of claim 3, wherein the packet frame comprises a transmission chain priority.

13. The method of claim 1, wherein the acknowledgement frame comprises a transmission chain priority.

14. The method of claim 1, wherein the first relay node is determined based on a predetermined reliable communication path.

15. The method of claim 1, wherein the first relay node is determined based on historical data.

16. The method of claim 3, wherein the first acknowledgement frame includes transmission information.

17. The method of claim 1, wherein a non-participant node delays a transmission of a second packet frame based on receiving the packet frame and deletes the packet frame without transmitting the packet frame.

18. A method comprising:
sending, from a source node, a packet frame intended for a destination node via two or more relay nodes, wherein the packet frame comprises a transmission chain identifying the two or more relay nodes and including relay node priority values for at least two relay nodes of the two or more relay nodes, wherein a first of the relay node priority values for a first of the at least two relay nodes is not equal to a second of the relay node priority values for a second of the at least two relay nodes;
storing the packet frame at the first of the at least two relay nodes;
transmitting the packet frame by the first of the at least two relay nodes after a delay time based on the first of the relay node priority values;
storing the packet frame at the second of the at least two relay nodes;

transmitting the packet frame by the second of the at least two relay nodes after a delay time based on the second of the relay node priority values, wherein the first delay time is not equal to the second delay time; and receiving at the source node at least one acknowledgement frame in response to the packet frame from at least one of the two or more relay nodes wherein the acknowledgement frame confirms receipt of the packet frame by the destination node.

19. The method of claim 18, wherein the transmission chain of the packet frame comprises an expected order corresponding to the two or more relay nodes.

20. The method of claim 19, wherein an out of order relay node from the two or more relay nodes receives, from the source node, the packet frame expected for the destination node and further comprising transmitting the packet frame, by the out of order relay node.

21. The method of claim 20, wherein a relay node cancels a relay obligation based on transmitting the packet frame by another relay node.

22. The method of claim 18, wherein a relay node cancels a relay obligation based on the acknowledgement frame.

23. The method of claim 18, wherein the packet frame comprises a transmission chain priority.

24. The method of claim 18, wherein the acknowledgement frame comprises a transmission chain priority.

25. The method of claim 18, wherein the first relay node is determined based on a predetermined reliable communication path.

26. The method of claim 18, wherein the first relay node is determined based on historical data.

27. The method of claim 18, wherein the first acknowledgement frame includes transmission information.

28. The method of claim 18, further comprising:
resending, from the source node, the packet frame intended for a destination node via at least one relay node if at least one acknowledgement frame in response to the packet frame is not received within a predetermined amount of time.

29. The method of claim 18, wherein a non-participant node delays a transmission of a second packet frame based on receiving the packet frame and deletes the packet frame without transmitting the packet frame.

30. A method comprising:
sending, from a source node, a packet frame intended for a first destination node and a second destination node via two or more relay nodes, the packet frame comprising a transmission chain identifying the two or more relay nodes and including a relay node priority values for at least two relay nodes of the two or more relay nodes, wherein a first of the relay node priority values for a first of the at least two relay nodes is not equal to a second of the relay node priority values for a second of the at least two relay nodes;
receiving, at the first of the at least two relay nodes, the packet frame;
transmitting the packet frame, by the first of the at least two relay nodes after a delay time based on the first of the relay node priority values;
receiving, at the second of the at least two relay nodes, at the same time as or before the receiving of the packet frame by the first of the at least two relay nodes, the packet frame, wherein the transmission chain identifies the second of the at least two relay nodes as a subsequent relay node to the first of the at least two relay nodes; and transmitting the packet frame, by the second of the at least two relay nodes, after a second delay time based on the second relay node priority value, wherein the second delay time is longer than the first delay time and the transmitting of the packet frame by the second of the at least two relay nodes occurs after the transmitting of the packet frame by the first of the at least two relay nodes;

receiving at least one acknowledgement frame in response to the packet frame from a first relay node of the at least one relay node wherein the acknowledge frame confirms receipt of the packet frame by the first destination node; and receiving at least one acknowledgement frame in response to the packet frame from a second relay node of the at least one relay node wherein the acknowledge frame confirms receipt of the packet frame by the second destination node.

31. The method of claim 30, wherein a relay node cancels a relay obligation based on the first and the second acknowledgement frame.

32. The method of claim 30, wherein a relay node cancels a relay obligation based on transmitting the packet frame by another relay node.

33. The method of claim 30, wherein a relay node cancels a relay obligation based on the acknowledgement frame.

34. A method comprising:
sending, from a source node, a packet frame intended for a destination node via a plurality of relay nodes, the packet frame identifying the plurality of relay nodes and including a first relay node priority value for a first relay node of the plurality of relay nodes and a second relay node priority value for a second relay node of the plurality of relay nodes, the first relay node priority value not equal to the second relay node priority value;
receiving, at the first relay node, the packet frame;
not transmitting, by the first relay node, the packet frame during a first delay time based on the first relay node priority value after the receiving of the packet frame by the first relay node;
receiving, at the second relay node, the packet frame, at the same time as or after the receiving of the packet frame at the first relay node;
transmitting, by the second relay node, the packet frame, after a second delay time based on the second relay node priority value, wherein the second delay time is less than the first delay time;
receiving, by the first relay node, the packet frame transmitted by the second relay node before the end of the first delay time; and
deleting the packet frame from the first relay node without transmitting the packet frame, in response to the receiving of the packet frame transmitted by the second relay node.

* * * * *